March 24, 1970 MITSUO OSADA 3,502,913

PIEZOELECTRIC CERAMICS AND DEVICE FOR HIGH VOLTAGE GENERATION

Filed May 6, 1966 2 Sheets-Sheet 1

INVENTOR.
MITSUO OSADA
BY
CAROTHERS & CAROTHERS
HIS ATTORNEYS

PIEZOELECTRIC CERAMICS AND DEVICE FOR HIGH VOLTAGE GENERATION

Filed May 6, 1966 2 Sheets-Sheet 2

INVENTOR.
MITSUO OSADA
BY
CAROTHERS & CAROTHERS
HIS ATTORNEYS

United States Patent Office 3,502,913
Patented Mar. 24, 1970

3,502,913
PIEZOELECTRIC CERAMICS AND DEVICE FOR HIGH VOLTAGE GENERATION

Mitsuo Osada, Nishinomiya, Japan, assignor to Sumitomo Electric Industries, Ltd., Osaka, Japan, a company of Japan Filed May 6, 1966, Ser. No. 548,168
Int. Cl. H01v 7/00; C04b 35/00
U.S. Cl. 310—8.7 9 Claims

ABSTRACT OF THE DISCLOSURE

A piezoelectric ceramic composition consisting essentially of lead titanate zirconate with partial substitution of the lead by strontium and containing 0.05 to 3.0% by weight of indium and at least one element selected from the group consisting of boron and vanadium in an amount sufficient to decrease the electrical permittivity loss attributable to the inclusion of the indium. Said composition is utilized in ignition devices.

The invention relates in general to an improved piezoelectric ceramic and to a high voltage impulse generating device employing the said ceramics.

As is well known, several developments which are profitably successful, have so far been proposed concerning the use of an electric spark for ignition of fuel or fuel/air mixture, or gas in small gas appliances such as small gasoline engines, wherein the spark is produced by a high voltage generated pursuant to the piezoelectric phenomenon. Such systems employ a piezoelectric material, for example a piezoelectric ceramic which, when sharply stressed mechanically, generates a voltage pulse.

The invention seeks to provide a novel piezoelectric ceramic and a device employing the ceramics for generation of a high voltage.

An object of the present invention is to provide an improved piezoelectric product of the ceramic type for high voltage generation, having large output impulse voltage/stress characteristics, unusually long service life (durability) under severe operating conditions of stressing and an excellent mechanical strength.

Another object of the present invention is to provide a piezoelectric device incorporating the element of the aforementioned type and capable of generating a high impulse voltage sufficient to give a spark without need of an ordinary or conventional high voltage power source.

Thus the invention concerns an improved piezoelectric product for attainment of the above described objects and advantages which is based on such matetrials as lead zirconate titanate, wherein $Sr^{+2}$ is partially substituted for $Pb^{+2}$ as disclosed in U.S. Patent No. 2,906,710, and incorporates the teachings of this invention.

Namely, the invention involves the addition of a very small quantity of $In_2O_3$ only or $In_2O_3$ and $B_2O_3$ or $V_2O_5$ to a solid solution of lead zirconate titanate after substitution therein of a part of $Pb^{+2}$ by $Sr^{+2}$, which in turn provides the improvement of aging stability (durability) of the material against severe stresses and assures an increased ouput voltage impulse as well as improved mechanical strength.

Other objects and advantages appear hereinafter in the following description and claims.

The accompanying drawings show, for the purpose of exemplification without limiting the invention or the claims thereto, certain practical embodiments illustrating the principles of this invention wherein:

FIGURE 1 is a diagram showing an arrangement for measuring the output impulse voltage of the piezoelectric ceramics prepared and fabricated in accordance with the invention which has been mechanically stressed.

FIGURES 2*a* and 2*b* are graphs showing the voltage/stress characteristics of some of the ceramics listed in the accompanying Table 1.

Figure 1:
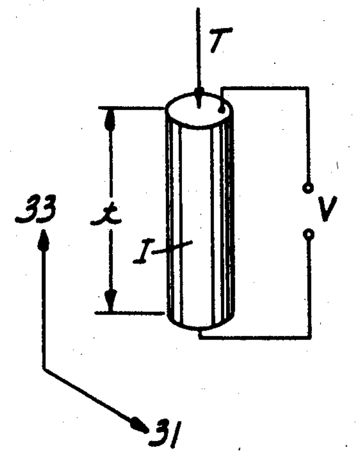

Referring to FIGURE 1, an output impulse voltage from a piezoelectric ceramic embodying the invention, arising from the application of mechanical stress to the ceramic is measured by applying a compression stress T in a direction of the poralization axis of the piezoelectric element I, and the output voltage V developed across the electrodes as a result thereof can be expressed by the following formula:

$$V=g_{33}\cdot T\cdot t \quad (1)$$

where:

$g_{33}$=Piezoelectric voltage output coefficient,
T=Stress,
$t$=Thickness of element, and
V=Available output voltage.

It should be noted that $g_{33}$ is obtained by measurement conducted under no stress applied and may vary when the tested ceramic element has been subjected to the very high pressure, due to the influence of a stressing pressure, and that actual output voltage may not be exactly as calculated from the above Formula 1, depending on the type of material making up the piezoelectric element.

The piezoelectric element for which the data shown in the accompanying tables and plotted in the accompanying drawings was manufactured pursuant to the following:

Materials of the element ($PbO$, $ZrO_2$, $TiO_2$ and $SrCO_3$) of a relatively pure grade (C.P. grade) are pulverized and then mixed adequately in suitable proportions. The mixtures so prepared are compacted into a block of a desired shape and calcinated at a temperature from 800° C. to 1,000° C. The calcined block is then crushed and milled to a very small particle size of 1 to 2$\mu$ and formed into a cylinder having a diameter of 11 mm. and a length of 22 mm. which is then sintered at a temperature from 1,300° C. to 1,350° C.

The sintered ceramic cylinder is subsequently machined to a size of 9.5 mm. diameter by 19 mm. long silvered on both ends to provide the coating electrodes thereon, and finally polarized by applying D.C. electric field (2–3 KV/mm.) in the axial direction of the fabricated ceramic cylinder.

Table 1 illustrates by way of example various compositions embodying the invention and shows the piezoelectric characteristics data of ceramics having the addition of $In_2O_3$ only or $In_2O_3$—$B_2O_3$ or $In_2O_3$—$V_2O_5$.

The first column following the composition column, indicates the applied stressing pressure in grams per cubic centimeter. In the tables and graphs, compositions (i) and (ii) are given as comparison examples only—compositions (iii) to (ix) representing embodiments of the invention.

As may be seen from Table 1 the addition of $In_2O_3$ gives rise to a drop of permitivity $K_3T$ and the joint addition of $B_2O_3$ or $V_2O_5$ and $In_2O_3$ results in a rise of permittivity of $K_3T$ as compared with the permittivity as realized by addition of $In_2O_3$ only.

Figures 2A, 2B:
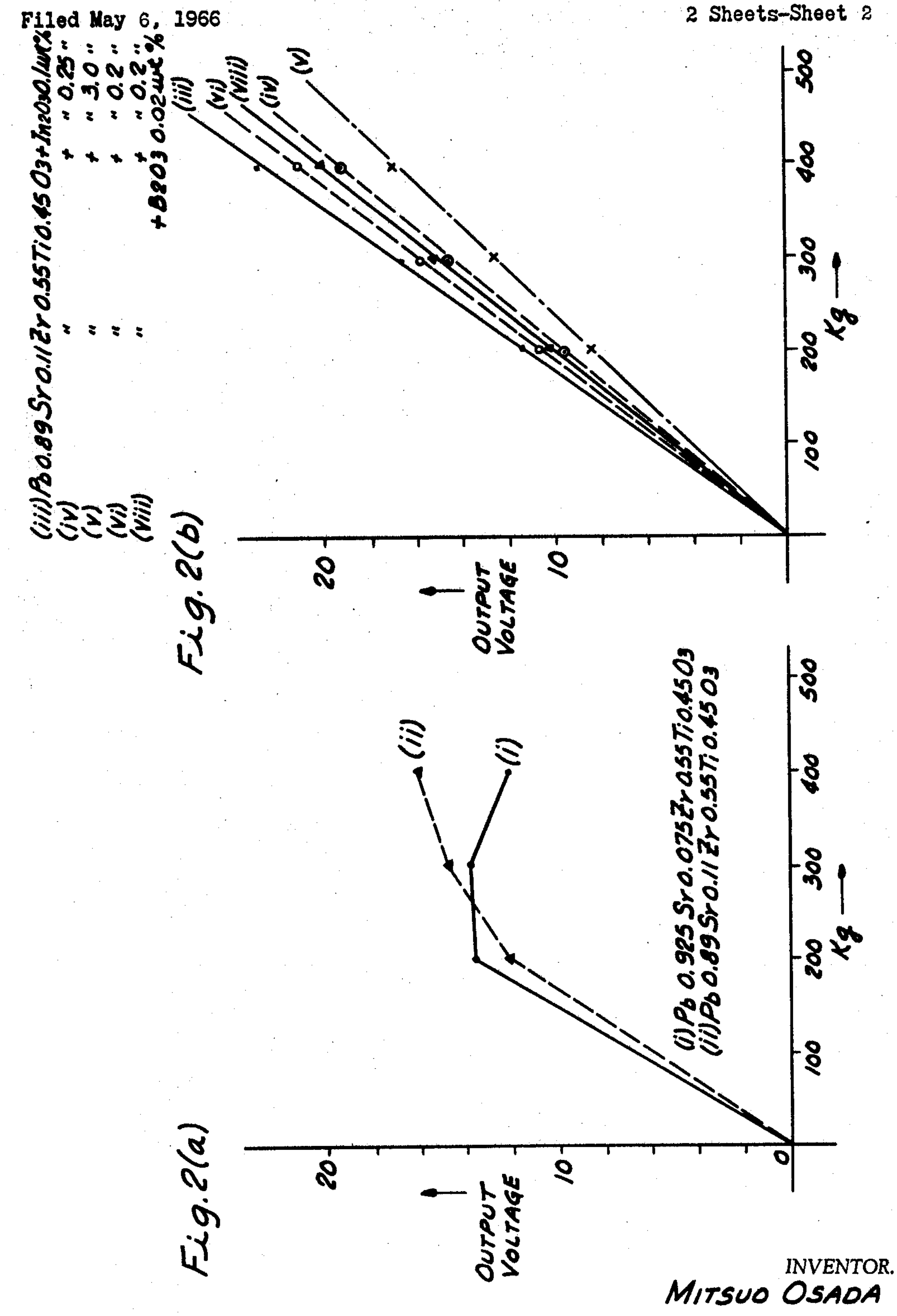

FIGURE 2 shows the output voltage/stress characteristics of various piezoelectric ceramics embodying the invention as listed in Table 1; FIG. 2*a* shows the plotted output voltage/stress characteristics of the ceramics of lead zirconate titanate wherein $Pb^{+2}$ has been partially replaced with $Sr^{+2}$ and FIG. 2*b* illustrates the plottings of the similar characteristics of the said lead zirconate titanate, to which $In_2O_3$ only or $In_2O_3+B_2O_3$ or $$In_2O_3+V_2O_5$$

have been added.

Figure 3:
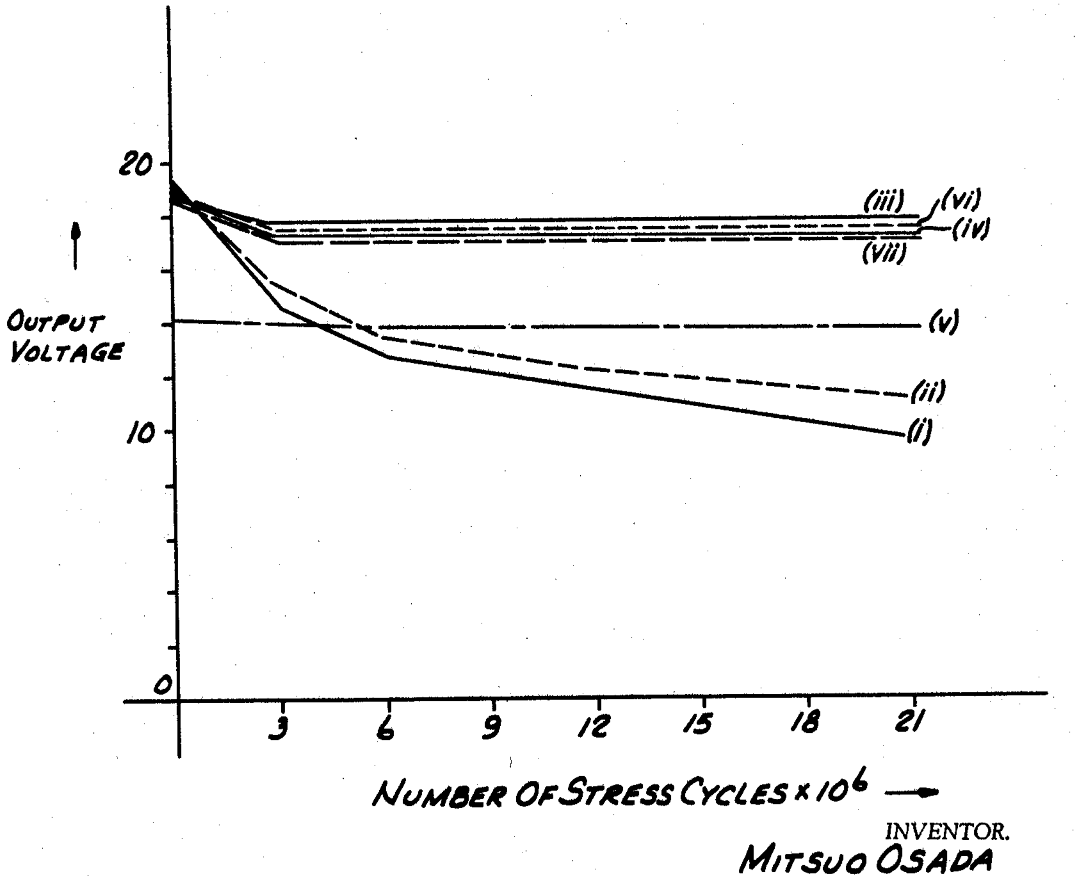
FIGURE 3 is a graph showing the durability or aging of some of the ceramics listed in the accompanying Table 1 in terms of the available output voltage against the total number of stressings.

Output voltage in the ordinates of both FIG. 2*a* and FIG. 2*b* and 3 is the value as obtained across the spark gap when measuring the actual electrical output appearing as a voltage at the time of instantaneous removal of stressing pressure applied to both electrodes as specified for testing the specimen of the ceramics manufactured and formed into a cylinder 19 mm. long by 9.5 diameter in accordance with the invention.

The values plotted in FIG. 3 clearly indicate that addition of $In_2O_3$ only or $In_2O_3+B_2O_3$ or $In_2O_3+V_2O_5$ greatly contributes to an appreciable improvement of service life (durability) in terms of total number of heavy stressings generating the output pressure.

FIG. 3 shows the plotted relationship between available output voltage and the stress cycle by application of mechanical force.

Tests providing the plotted results were carried out only to find the durability as expressed as output voltage/applied stress and output voltage/total number of stressing, so that FIG. 3 showing the results of the latter tests can not provide a guide for the comparison of the absolute value of generated output voltage among all types of tested ceramics composed in accordance with the invention.

Table 2 shows the piezoelectric characteristics of all the specimens of the ceramics as found by measurement after stability testing, results of which are as plotted in FIG. 3. From all the results shown in the accompanying tables and plottings, it is evident that the addition of $In_2O_3$ only or $In_2O_3+B_2O_3$ or $In_2O_3+V_2O_5$ to the lead zirconate titanate in accordance with the invention contributes greatly to the rise of output voltage stability against the repetition (total number) of stressings and that the joint addition of $In_2O_3$ and $B_2O_3$ or $V_2O_5$ provides the larger electrical permittivity than that resulting from addition of $In_2O_3$ only.

It has also been found that addition of $In_2O_3$ less than 0.05 wt. percent is not practically effective to provide actual improvement in the piezoelectric characteristics of the ceramics and the addition thereof in excess of 3.0 wt. percent is rather deleterious because it causes a drop in the available output voltage resulting from the piezoelectric effect.

Another finding is that the addition of $B_2O_3$ or $V_2O_5$ to the lead zirconate titanate/$In_2O_3$ composition pursuant to the invention affords only a small improvement in the electric permittivity of the ceramics when the addition is less than 0.01 wt. percent, and also that it is difficult to achieve successful polarization of the ceramic because of the unavoidable occurrence of porosity in the structure of the ceramic element when the said addition has been more than 0.05 wt. percent.

Figure 4:
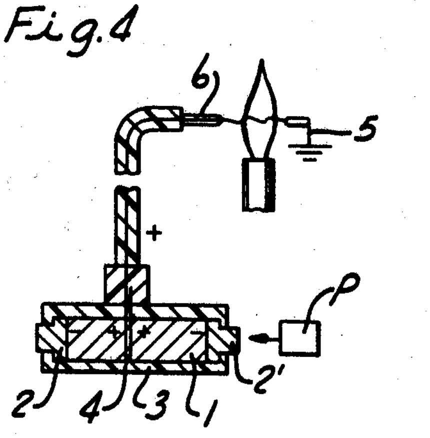
FIGURE 4 shows the arrangement of an ignition device, comprising a piezoelectric element embodying the invention.

FIG. 4 illustrates an example of the gas ignition device incorporating the ceramic element, representing an embodiment of an improved piezoelectric ceramic manufactured in accordance with the invention. The piezoelectric ceramic element 1 is encased in the insulated housing 3, the said element having the metal discs 2 and 2′ providing impact contacts on its silver-coated end. Application of the mechanical stress *p*, as by a hammer blow to the metal disc at one end from outside, gives rise to the generation of a piezoelectric output voltage which is then led out through the wire leading from the electrodes 4. This output voltage then causes the generation of spark 6 in conjunction with the earth 5, thus providing a means of igniting the inflammable fuel or fuel/air mixture issuing from a gas nozzle 7.

A device for generating an electric voltage in accordance with the invention is advantageous in that it is of such a construction that it assures an output voltage high enuough to produce a spark solely by application of mechanical stress caused from outside, and accordingly needs no incorporation of additional electrical power source and no wiring connection for the supply of electrical energy from outside. Furthermore there is no possibility of deterioration of the ceramic element 1 with respect to the available piezoelectric characteristic, thus assuring an almost semi-permanent service life of the element and accordingly, of an ignition device incorporating the invention.

TABLE 1

| No. | Composition | (g./cc.) | $k_{33}$ (Percent) | $K_3T$ | $g_{33}\times10^{-3}$ | $d_{33}\times10^{-1}$ |
|---|---|---|---|---|---|---|
| (i) | $Pb_{0.925}Sr_{0.075}Zr_{0.55}Ti_{0.45}O_3$ | 7.57 | 68 | 700 | 35.5 | 220 |
| (ii) | $Pb_{0.89}Sr_{0.11}Zr_{0.55}Ti_{0.45}O_3$ | 7.50 | 71 | 1,540 | 25.6 | 348 |
| (iii) | $Pb_{0.89}Sr_{0.11}Zr_{0.55}Ti_{0.45}O_3+In_2O_3$ 0.1 wt. percent | 7.53 | 68 | 1,270 | 28.0 | 315 |
| (iv) | $Pb_{0.89}Sr_{0.11}Zr_{0.55}Ti_{0.45}O_3+In_2O_3$ 0.25 wt. percent | 7.54 | 66 | 970 | 30.6 | 260 |
| (v) | $Pb_{0.89}Sr_{0.11}Zr_{0.55}Ti_{0.45}O_3+In_2O_3$ 3.0 | 7.57 | 52 | 940 | 22.3 | 185 |
| (vi) | $Pb_{0.89}Sr_{0.11}Zr_{0.55}Ti_{0.45}O_3+In_2O_3$ 0.2 | 7.56 | 66 | 1,100 | 27.1 | 240 |
| (vii) | $Pb_{0.89}Sr_{0.11}Zr_{0.55}Ti_{0.45}O_3+In_2O_3$ 0.2 wt. percent+0.01 wt. percent $B_2O_3$ | 7.53 | 64.5 | 1,270 | 23.3 | 262 |
| (viii) | $Pb_{0.89}Sr_{0.11}Zr_{0.55}Ti_{0.45}O_3+In_2O_3$ 0.2 wt. percent+0.02 wt. percent $B_2O_3$ | 7.49 | 66.5 | 1,460 | 23.0 | 295 |
| (ix) | $Pb_{0.89}Sr_{0.11}Zr_{0.55}Ti_{0.45}O_3+In_2O_3$ 0.2 wt. percent+0.1 wt. percent $V_2O_5$ | 7.49 | 65.0 | 1,430 | 22.4 | 287 |

TABLE 2

| No. | (g./cc.) | $k_{33}$ (Percent) | $K_3T$ | $g_{33}\times10^{-3}$ | $d_{33}\times10^{-12}$ |
|---|---|---|---|---|---|
| (ii) | 7.50 | 62 | 1,960 | 18.4 | 320 |
| (iii) | 7.53 | 69 | 1,510 | 21.4 | 284 |
| (iv) | 7.54 | 68 | 1,030 | 28.4 | 259 |
| (v) | 7.59 | 51 | 940 | 22.7 | 189 |
| (vi) | 7.56 | 66 | 1,150 | 27.5 | 245 |
| (vii) | 7.53 | 65 | 1,330 | 22.3 | 268 |
| (viii) | 7.49 | 67 | 1,500 | 22.4 | 301 |
| (ix) | 7.49 | 65 | 1,480 | 21.4 | 280 |

$g_{33}$, Volt meter/newton; $d_{33}$, Coulomb/newton.

NOTE.—Tested by "IRE standards on Piezoelectric Crystals August 1961."

I claim:

1. A piezoelectric ceramic composition consisting essentially of lead titanate zirconate with partial substitution of the lead by strontium in an amount sufficient to increase the piezoelectric constant of the ceramic and containing indium in an amount sufficient to decrease the dielectric and mechanical losses of the ceramic, characterized by the inclusion of at least one element selected from the group consisting of boron and vanadium in an amount sufficient to decrease the electrical permittivity loss attributable to the inclusion of the indium.

2. The piezoelectric ceramic composition of claim 1, wherein up to approximately 30 mol percent of the lead is substituted by the strontium.

3. The piezoelectric ceramic composition of claim 2, wherein 0.05 to 3.0 percent by weight of indium is included therein.

4. A piezoelectric ceramic composition consisting essentially of lead titanate zirconate with approximately 1 to 30 mol percent substitution of the lead by strontium and containing 0.05 to 3.0 percent by weight of indium and one element selected from the group consisting of boron and vanadium in an amount sufficient to decrease the electrical permittivity loss attributable to the inclusion of the indium.

5. The piezoelectric ceramic composition of claim 4, wherein the selected one of said group is boron incorporated in the amount of 0.01 to 0.05 percent by weight.

6. A piezoelectric ceramic element for generating a high electric voltage, having the composition $$PbZr_{(1-x)}Ti_xO_3$$

(x=0.4 to 0.5) wherein a portion of the $Pb^{+2}$ is substituted by $Sr^{+2}$ and containing 0.05 to 3.0 wt. percent of $In_2O_3$ and 0.01 to 0.05 wt. percent $B_2O_3$.

7. The piezoelectric ceramic composition of claim 6, wherein up to approximately 30 mol percent of the $Pb^{+2}$ is substituted by $Sr^{+2}$.

8. A device for generating a high electric voltage comprising a piezoelectric ceramic element having a composition consisting essentially of lead titanate zirconate with approximately 1 to 30 mol percent substitution of the lead by strontium and containing 0.05 to 3.0 percent by weight of indium and one element selected from the group consisting of boron and vanadium in an amount sufficient to decrease the electrical permittivity loss of the ceramic attributable to the inclusion of the indium, an insulating housing encasing said element, a conductive impact contact electrically connected to one side of said element and extending through said housing, and an electrode applied to the opposed side of said element and extending through said housing.

9. The device of claim 8, characterized by a pair of said conductive impact contacts electrically connected to opposite sides of said element, said electrode applied to said element intermediate its ends.

References Cited

UNITED STATES PATENTS 3,219,583 11/1965 Cook et al. .......... 252—62.9

ROBERT D. EDMONDS, Primary Examiner

J. COOPER, Assistant Examiner

U.S. Cl. X.R.

106—39; 252—62.9